United States Patent
Loughran et al.

(10) Patent No.: US 6,710,769 B2
(45) Date of Patent: *Mar. 23, 2004

(54) PORTABLE COMPUTING DEVICE THAT RECORDS OPERATOR INPUTS

(75) Inventors: Stephen A Loughran, Corvallis, OR (US); Weng Wah Loh, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 09/874,190

(22) Filed: Jun. 4, 2001

(65) Prior Publication Data

US 2002/0180705 A1 Dec. 5, 2002

(51) Int. Cl.[7] .................................................. G09G 5/00
(52) U.S. Cl. ....................... 345/168; 345/156; 345/157; 345/158; 345/169; 345/168; 345/170; 345/171; 345/173; 345/179; 341/21; 341/22; 341/23; 341/24
(58) Field of Search ................................. 345/156, 157, 345/158, 170, 171, 173, 179, 168, 169; 341/21–24

(56) References Cited

U.S. PATENT DOCUMENTS

| | | | | |
|---|---|---|---|---|
| 5,264,992 A | * | 11/1993 | Hogdahl et al. | 367/681 |
| 5,440,502 A | * | 8/1995 | Register | 364/708.1 |
| 5,717,428 A | * | 2/1998 | Barrus et al. | 345/168 |
| 5,955,867 A | * | 9/1999 | Cummings et al. | 320/107 |
| 5,982,147 A | | 11/1999 | Anderson | 320/132 |
| 6,144,976 A | | 11/2000 | Silva et al. | |
| 6,184,943 B1 | * | 2/2001 | Sellers | 348/744 |
| 6,211,862 B1 | * | 4/2001 | Park et al. | 345/169 |
| 6,292,181 B1 | * | 9/2001 | Banerjee | 345/179 |
| 6,304,250 B1 | * | 10/2001 | Yang et al. | 345/168 |
| 6,456,036 B1 | * | 9/2002 | Thandiwe | 320/106 |
| 6,560,612 B1 | * | 5/2003 | Yamada et al. | 707/104.1 |

FOREIGN PATENT DOCUMENTS

| | | |
|---|---|---|
| GB | 1497556 | 8/1975 |
| GB | 2166893 A | 5/1986 |
| WO | WO 91/12578 | 8/1991 |

OTHER PUBLICATIONS

Loh et al. Sep. 12, 2002, Pub. No: US 2002/0129288A1.*

* cited by examiner

Primary Examiner—Richard Hjerpe
Assistant Examiner—Jennifer Nguyen
(74) Attorney, Agent, or Firm—Jeff D. Limon

(57) ABSTRACT

A computing device includes a keyboard controller that is adapted to convey an operator input from the keyboard controller along a communications channel. Also included is a battery module, which is interfaced to the communications channel, for receiving the operator input. The computing device further includes a memory element located within the battery module for recording the operator input.

21 Claims, 2 Drawing Sheets

PORTABLE COMPUTING DEVICE THAT RECORDS OPERATOR INPUTS

BACKGROUND OF THE INVENTION

The invention relates generally to the field of computing devices and, more particularly, to recording operator inputs to a computing device.

As portable computing devices continue to gain in popularity, the need to record and store operator inputs in a location that can be easily accessed increases as well.

Thus, what is needed is a method and apparatus for storing operator keystrokes in a location that can be easily accessed.

SUMMARY OF THE INVENTION

The invention is pointed out with particularity in the appended claims. However, at least some aspects of the invention are summarized below.

According to one aspect of the invention, a computing device that records an operator input comprises a keyboard controller that is adapted to convey the operator input along a communications channel. The computing device further comprises a battery module, which is interfaced to the communications channel, for receiving the operator inputs. Further included is a memory element, located within the battery module, for recording the operator input.

According to another aspect of the invention, a method for recording a representation of an operator selection in a computing device is disclosed. The method comprises conveying the representation of the operator selection from a keyboard processor. The method additionally includes receiving the representation of the operator selection at a battery module. The invention further includes storing the representation of the operator selection in the battery module.

BRIEF DESCRIPTION OF THE DRAWINGS

A more complete understanding of the various aspects of the claimed invention may be acquired by reading the description herein, in conjunction with the figures, wherein like reference numerals refer to like elements.

DESCRIPTION OF THE PREFERRED EMBODIMENTS

Figure 1:
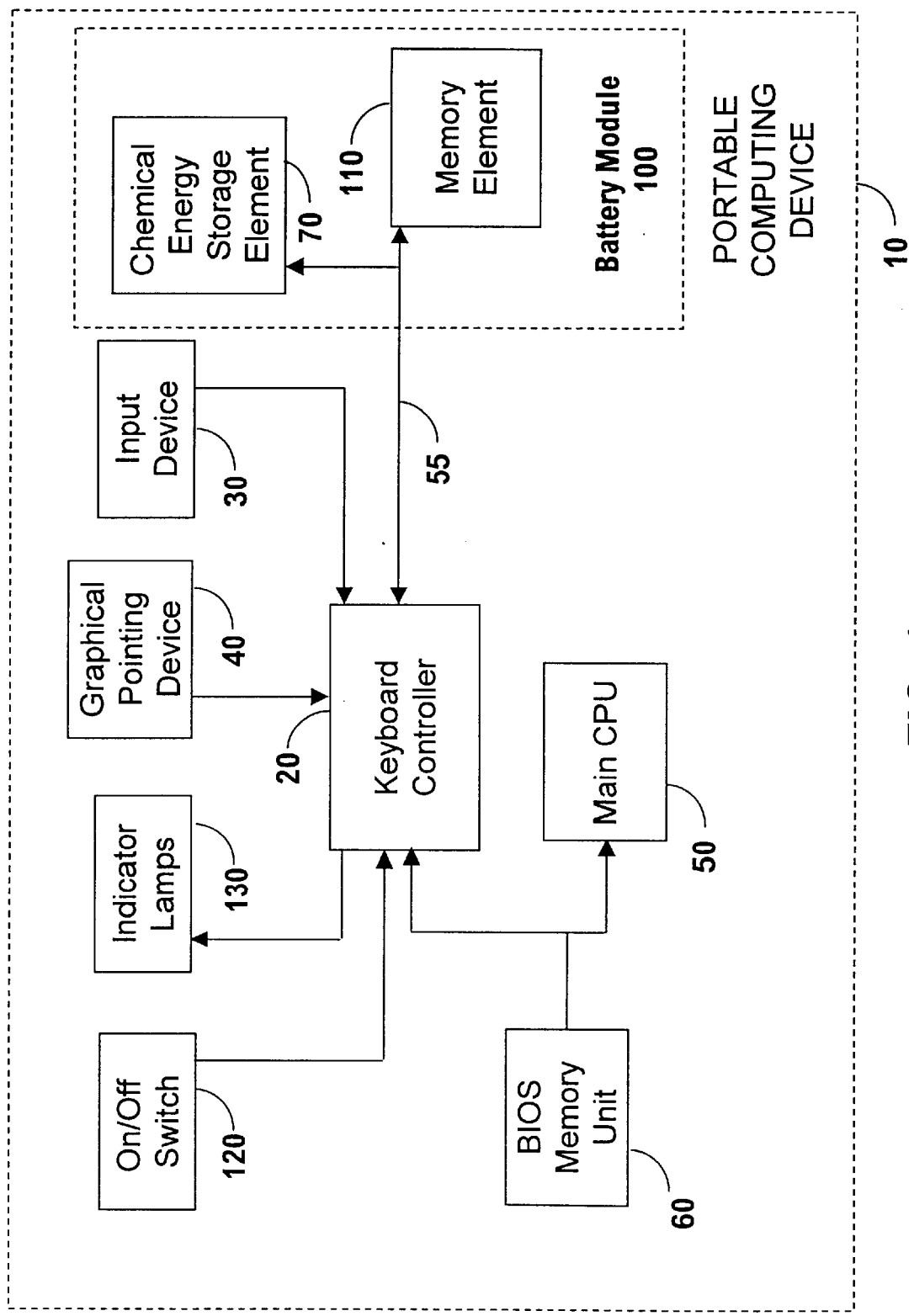
FIG. 1 is a block diagram of a portable computing device that records operator inputs in accordance with a preferred embodiment of the invention.

FIG. 1 is a block diagram of a portable computing device that records operator inputs in accordance with a preferred embodiment of the invention. In FIG. 1, portable computing device 10 includes, among other things, keyboard controller 20. Keyboard controller 20 includes a processor (not shown) that functions generally to receive inputs from input device 30 and can also receive inputs from graphical pointing device 40. Input device 30 represents a keyboard, keypad, or other device that allows a user to input alphanumeric or other symbolic data to portable computing device 10. Graphical pointing device 40 represents an input device that can include a mouse, trackpad, touchpad, or other input device manipulated by a user in order to control the position of a pointer on a display of portable computing device 10.

Preferably, keyboard controller 20 also receives inputs from ON/OFF switch 120. This allows keyboard controller 20 to initiate a Power On System Test (POST) or a shut down procedure of portable computing device 10 in response to the operator's selection Keyboard controller 20 also controls indicator lamps 130 which are used to indicate activity and status of portable computing device 10. Further, keyboard controller 20 conveys inputs from graphical pointing device 40 and input device 30 to main CPU 50.

An additional task executed by keyboard controller 20 is the monitoring of the performance of battery module 100 of portable computing device 10. Preferably, keyboard controller 20 includes an interface to communications channel 55 that is used to convey messages between the keyboard controller and the battery. Communications channel 55 can be a serial data bus or other conventional communications media. As an example, communications channel 55 can be an Inter-Integrated Circuits bus (I2C) bus used in some contemporary computers to monitor the functions of battery module 100 in order to efficiently recharge chemical energy storage element 70 of battery module 100 and protect the integrity of battery module 100.

In a preferred embodiment, keyboard controller 20 receives operator inputs from at least one of input device 30 and graphical pointing device 40. Keyboard controller 20 can additionally record operator selections from ON/OFF switch 120. Operator selections from one ore more of these devices are transmitted along communications channel 55 to battery module 100 in addition to being transmitted to main CPU 50.

Battery module 100 includes chemical energy storage element 70 and memory element 110. Chemical energy storage element 70 can be any type of conventional chemical storage media such as nickel cadmium, nickel metal hydride, lithium, or other commercially-available battery technology.

Memory element 110 is preferably housed within battery module 100. Memory element 110 preferably embodies a non-volatile memory storage capability that allows keystrokes from keyboard controller 20 to be stored. In an exemplary embodiment, memory element 110 is capable of storing from several thousand to several million bytes of data. This enables the memory element to record at least several days of operator keystrokes from input device 30. Alternatively, memory element 110 can store a mix of keystrokes and operator inputs from input device 30, graphical pointing device 40, and ON/OFF switch 120. Thus, for those users who rely heavily on the use of the keyboard and keyboard shortcuts, each of these operator inputs can be stored. Additionally, for those users who rely heavily on the use of a mouse or touch pad, inputs from these graphical pointing devices can be stored as well.

The capability to convey operator inputs from keyboard controller 20 to battery module 100 can be brought about by way of an upgrade or a change to the contents of Basic Input Output System (BIOS) memory unit 60. By way of a modification to BIOS memory unit 60, additional instructions can be uploaded into the operating memory of keyboard controller 20 during the normal POST function executed in many portable computing and laptop computing devices. These additional instructions instruct keyboard controller 20 to begin transmitting operator selections along communications channel 55 upon receipt of a message from memory element 110 of battery module 100. Preferably, this message indicates that battery module 100 includes a suitable memory element and is ready to accept keystrokes from the keyboard controller.

The change to BIOS memory unit 60 can be made by way of an upgrade to a device driver, such as a driver that controls a printer or other peripheral device. The required additional instructions for use by BIOS memory unit 60 can be incorporated into the upgrade and installed during the course of installing the upgrade. After the computing device is reinitialized (e.g. rebooted), keyboard controller 20 is capable of transmitting keystrokes along communications channel 55. Thus, when a battery (such as battery module 100) is installed in the computing device, the recording capability of the keyboard controller can be activated upon receipt of a message by the keyboard controller that battery module 100 is ready to receive and store operator selections.

In an alternate embodiment, a wireless transceiver can be installed within battery module 100. Desirably, this wireless transceiver functions to access memory element 110 when the wireless transceiver is commanded to do so. The information from memory element 110 can then be transmitted wirelessly in response to an external query conveyed to battery module 100 by way of the wireless transceiver. The information from memory element 110 can also be transmitted by way of the wireless transceiver at more regular intervals, such as when memory element 110 becomes full.

Figure 2:
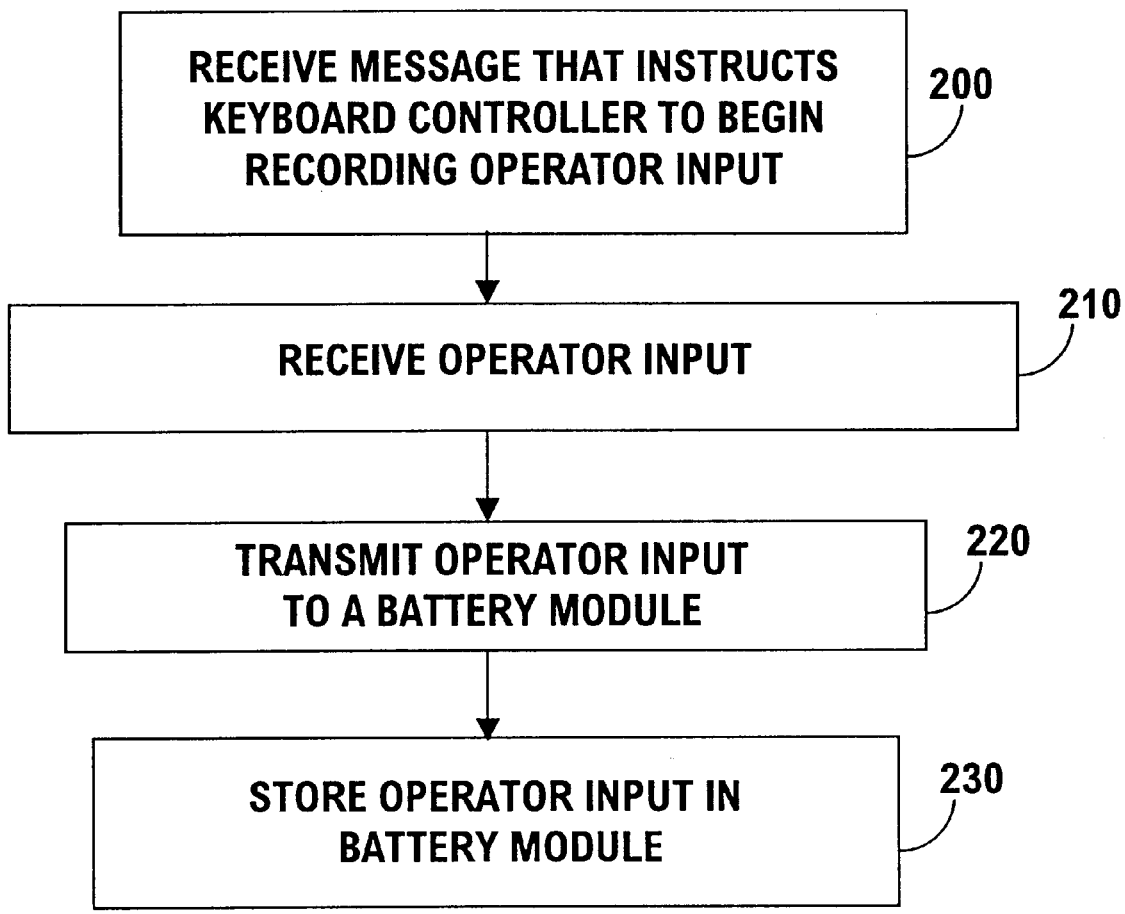
FIG. 2 is a flowchart of a method used within a portable computing device that records operator selections in accordance with a preferred embodiment of the invention.

FIG. 2 is a flowchart of a method used within a portable computing device that records operator selections in accordance with a preferred embodiment of the invention. The apparatus of FIG. 1 is suitable for performing the method of FIG. 2. The method of FIG. 2 begins at block 200 in which a keyboard controller receives a message that instructs the controller to begin recording operator inputs. This message can come from a battery module capable of recording information transmitted from the keyboard controller.

The method of FIG. 2 continues at block 210 in which an operator input, such as a keystroke, mouse or touchpad selection, or mode selection is made. The method continues at block 220 where the keyboard controller transmits the operator input to a battery module. This transmission is facilitated by way of a communications channel that can be an I2C data bus or other type of interface that exists between the keyboard controller and the battery module. The method concludes at block 230, where the operator input is stored in a memory element of the battery module.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It should be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A computing device that records an operator input, comprising:

a keyboard controller adapted to convey said operator input from said keyboard controller along a communications channel;

a battery module, which is interfaced to said communications channel, for receiving said operator input;

a memory element located within said battery module for recording said operator input, and a second memory element coupled to said keyboard controller for instructing said keyboard controller to transmit said operator input after receiving a notification that said memory element located within said battery module is ready to record said operator input.

2. The computing device of claim 1 wherein said operator input is a keystroke.

3. The computing device of claim 1 wherein said operator input is generated by a graphical pointing device coupled to said keyboard controller.

4. The computing device of claim 1 wherein said communications channel is a serial data bus.

5. The computing device of claim 4 wherein said serial data bus is an Inter-Integrated Circuit (I2C) bus.

6. The computing device of claim 1 wherein said second memory element is a read-only memory element that stores a power-on system test program.

7. The computing device of claim 1 wherein the contents of said second memory element are modified by a device driver that instructs said keyboard controller to begin conveying said operator inputs along said communications channel.

8. In a computing device, a method for recording a representation of an operator selection, comprising:

conveying said representation of said operator selection from a keyboard processor to a battery module;

receiving said representation of said operator selection at said battery module;

receiving a notification that said battery module is ready to record said representation of said operator selection, and storing said representation of said operator selection operator in said battery module.

9. The method of claim 8 wherein said operator selection is a keystroke.

10. The method of claim 8 wherein said operator selection is an input from a graphical pointing device.

11. The method of claim 8 wherein said conveying action occurs by way of transmitting said representation of said operator selection along a data bus.

12. The method of claim 11 wherein said data bus is an Inter-Integrated Circuit (I2C) bus.

13. The method of claim 8 further comprising a memory unit transmitting instructions to said keyboard processor, said instructions instructing said keyboard processor to transmit said operator selection after receiving said notification that a memory element located within said battery module is ready to record said representation of said operator selection.

14. The method of claim 13 further comprising modifying contents of said memory unit via an upgrade to a device driver program, said upgrade including instructions that instruct said keyboard processor to transmit said operator selection after receiving said notification that a memory element located within said battery module is ready to record said operator selection.

15. A module for recording operator inputs to a portable computing device, comprising:

a chemical energy storage element that provides energy to said portable computing device;

a memory element housed in an enclosure along with said chemical energy storage element, said memory element being adapted to record said representation of said operator selection, and a transmitter for transmitting a notification that said memory element is ready to record said operator inputs.

16. The module of claim 15 additionally comprising a data bus receiver that receives said operator inputs.

17. The module of claim 16 wherein said data bus is an Inter-Integrated Circuit (I2C) bus.

18. A program storage device readable by a computing device, tangibly embodying a program of instructions executable by said computing device to perform method steps for directing said computing device to record an operator input, said method comprising:

transmitting said operator input to a battery module, said transmitting action being performed by a keyboard controller of said computing device;

receiving said operator input at said battery module;

storing said operator input in a memory element located within said battery module, and a second memory element instructing said keyboard controller to transmit said operator input after receiving a notification that said memory element located within said battery module is ready to record said operator input.

19. The program storage device of claim 18 wherein said transmitting action is performed by way of transmitting said operator input along a data bus.

20. The program storage device of claim 19 wherein said data bus is an Inter-Integrated Circuit (I2C) bus.

21. The method of claim 18 further comprising modifying contents of said second memory element via an upgrade to a device driver, said upgrade including instructions which instruct said keyboard controller to begin transmitting said operator input to said battery module.

* * * * *